(12) United States Patent
Bornstein et al.

(10) Patent No.: US 8,429,666 B2
(45) Date of Patent: Apr. 23, 2013

(54) COMPUTING PLATFORM WITH RESOURCE CONSTRAINT NEGOTIATION

(75) Inventors: Daniel R. Bornstein, San Francisco, CA (US); Carl S. Shapiro, Palo Alto, CA (US); Jeffrey M. Brown, Mountain View, CA (US); Christopher Lynn Tate, Berkeley, CA (US)

(73) Assignee: Google Inc., Mountain View, CA (US)

( * ) Notice: Subject to any disclaimer, the term of this patent is extended or adjusted under 35 U.S.C. 154(b) by 2 days.

(21) Appl. No.: 13/358,406

(22) Filed: Jan. 25, 2012

(65) Prior Publication Data

US 2012/0192186 A1    Jul. 26, 2012

Related U.S. Application Data

(60) Provisional application No. 61/435,969, filed on Jan. 25, 2011.

(51) Int. Cl.
*G06F 9/46* (2006.01)
(52) U.S. Cl.
USPC .......................................... 718/104; 718/101
(58) Field of Classification Search ........................ None
See application file for complete search history.

(56) References Cited

U.S. PATENT DOCUMENTS

| | | | |
|---|---|---|---|
| 6,282,561 B1 * | 8/2001 | Jones et al. | 718/104 |
| 7,447,873 B1 * | 11/2008 | Nordquist | 712/22 |
| 7,805,726 B1 * | 9/2010 | Leonard et al. | 718/104 |
| 2003/0126164 A1 * | 7/2003 | O'Connor et al. | 707/206 |
| 2005/0172291 A1 * | 8/2005 | Das et al. | 718/104 |
| 2006/0143617 A1 | 6/2006 | Knauerhase et al. | |
| 2009/0183168 A1 | 7/2009 | Uchida | |

OTHER PUBLICATIONS

International Search Report and Written Opinion for PCT/US2012/022571 mailed Apr. 11, 2012, 11 pages.

* cited by examiner

*Primary Examiner* — Camquy Truong
(74) *Attorney, Agent, or Firm* — McDonnell Boehnen Hulbert & Berghoff LLP (57) ABSTRACT

Various techniques are described for resource management on a computing platform. A computing platform can receive a query message that specifies an amount of a resource proposed for allocation. The computing platform can select a selected recommendation level from a plurality of recommendation levels, based on an evaluation of a request for the amount of the resource proposed for allocation. The computing platform can generate a resource allocation recommendation that includes the selected recommendation level with respect to the amount of the resource proposed for allocation. The computing platform can send the resource allocation recommendation.

25 Claims, 7 Drawing Sheets

COMPUTING PLATFORM WITH RESOURCE CONSTRAINT NEGOTIATION

CROSS REFERENCE TO RELATED APPLICATIONS

This application claims priority to U.S. Pat. App. No. 61/435,969, entitled "Computer Platform with Resource Constraint Negotiations", filed Jan. 25, 2011, which is incorporated by reference herein for all purposes.

BACKGROUND

Computing platforms, such as personal computers, tablet computers, laptops, cellular telephones, and other mobile or portable devices can include a system monitor to monitor and manage their resources and performance. For instance, the system monitor can monitor and manage resources within the computing platform, such as memory, that can be requested by and allocated to various software processes running on the computing platform. A process can request additional resources from the computing platform, and the system monitor can grant the request and allocate the requested resources or, in some instances, terminate the process based on the effect granting the request would have on overall system resources or performance.

SUMMARY

In one aspect, an article of manufacture is provided. The article of manufacture includes a non-transitory computer-readable storage medium with instructions stored thereon that, in response to execution by a processor of a computing platform, cause the computing platform to perform operations. The instructions include: (a) instructions for receiving a query message, where the query message specifies an amount of a resource proposed for allocation, (b) instructions for selecting a selected recommendation level from a plurality of recommendation levels based on an evaluation of a request for the amount of the resource proposed for allocation, (c) instructions for generating a resource allocation recommendation including the selected recommendation level, and (d) instructions for sending the resource allocation recommendation.

In another aspect, a method is provided. A computing platform receives a query message that specifies an amount of a resource proposed for allocation from the computing platform. The computing platform selects a selected recommendation level from a plurality of recommendation levels based on an evaluation of a request for the amount of the resource proposed for allocation. Using the computing platform, a resource allocation recommendation including the selected recommendation level is generated. Using the computing platform, the resource allocation recommendation is sent.

In another aspect, an article of manufacture is provided. The article of manufacture includes a non-transitory computer-readable storage medium with instructions stored thereon that, in response to execution by a processor of a computing platform, cause the computing platform to perform operations. The instructions include: (a) instructions for sending a query message that specifies an amount of a resource proposed for allocation, (b) instructions for, in response to the query message, receiving a resource allocation recommendation related to the amount of the resource proposed for allocation, the resource allocation recommendation comprising a selected recommendation level of a plurality of recommendation levels, (c) instructions for generating a response to the resource allocation recommendation, where the response is based on the selected recommendation level, and (d) instructions for sending the response to the resource allocation recommendation.

In another aspect, a method is provided. A computing platform sends a query message that specifies an amount of a resource proposed for allocation from the computing platform. In response to the query message, the computing platform receives a resource allocation recommendation related to the amount of the resource proposed for allocation at the computing platform. The resource allocation recommendation includes a selected recommendation level of a plurality of recommendation levels. Using the computing platform, a response to the resource allocation recommendation based on the selected recommendation level is generated. The computing platform sends the response to the resource allocation recommendation.

DETAILED DESCRIPTION

Overview

In a modern computing platform, an operating system is software that performs various tasks to govern the computing platform. These tasks can be related to execution of application software, management of resources, such as memory, processor(s), and input/output devices associated with the computing platform.

The operating system can include a "system monitor" to manage the resources between the competing requirements of one or more processes or executing computer programs. In some cases, a process can use sub-processes, such as threads, to carry out sub-tasks of the process. The system monitor can allocate resources to the processes to permit successful execution of the processes and/or sub-processes. These resources can include computer memory, computer processor usage, battery power, network bandwidth, access to data provided to and/or received from input/output devices, and other computing-platform-related resources.

In some cases, allocation of various data items in the operating system can be controlled by the system monitor as well. For example, the operating system can be configured with a fixed number of control blocks required to start processes, and consequently have a fixed number of processes that can be started at one time. In this example, the system monitor can manage the control block resources by requiring a process to specifically request and receive a control block before starting the process. If a control-block request is denied, then the process is unable to execute due to the lack of a control block.

The system monitor can be configured to provide recommendations and other information about resource requests. For example, suppose a process requires an additional 10 megabytes (MBs) of memory to continue execution. A channel of communication can be established between the system monitor and the process to enable the process to query if a given request for a particular resource—in this case, 10 MB of memory—would be acceptable. In response to the query, the system monitor can provide one of a plurality of recommendation levels as part of a resource allocation recommendation. Example recommendation levels can range from "approved" to "strongly recommended against."

The system monitor can use resource allocation recommendations both to inform processes about resource constraints and indicate a severity level of the resource constraints. That is, a process can explicitly ask the system monitor how good or bad an idea it would be—from the system monitor's perspective—for the process to receive the requested allocated resources.

For example, suppose a process is requesting memory in a memory-constrained environment, e.g., one with a relatively large number of simultaneously active processes. In this memory-constrained environment, following the resource allocation recommendations provided by the system monitor can lead the process to be relatively conservative in requesting memory and/or be relatively aggressive in reclaiming memory. In a less memory-constrained environment; e.g., one with a relatively small number of simultaneously active processes, the resource allocation recommendations can inform the process that the computing platform can support requests for additional memory.

Processes can be expected to follow the resource allocation recommendations of the system monitor by requesting resources when "approved" and to consider delaying requesting resources and/or reclaiming memory when "strongly recommended against." By providing and following resource allocation recommendations, the computing platform can enable the system monitor and processes to negotiate resource constraints and better allocate resources. Further, the processes operating on the computing platform can be better informed about the status of resources on the computing platform when making resource allocation requests.

An Example Computing Platform

Figure 1:
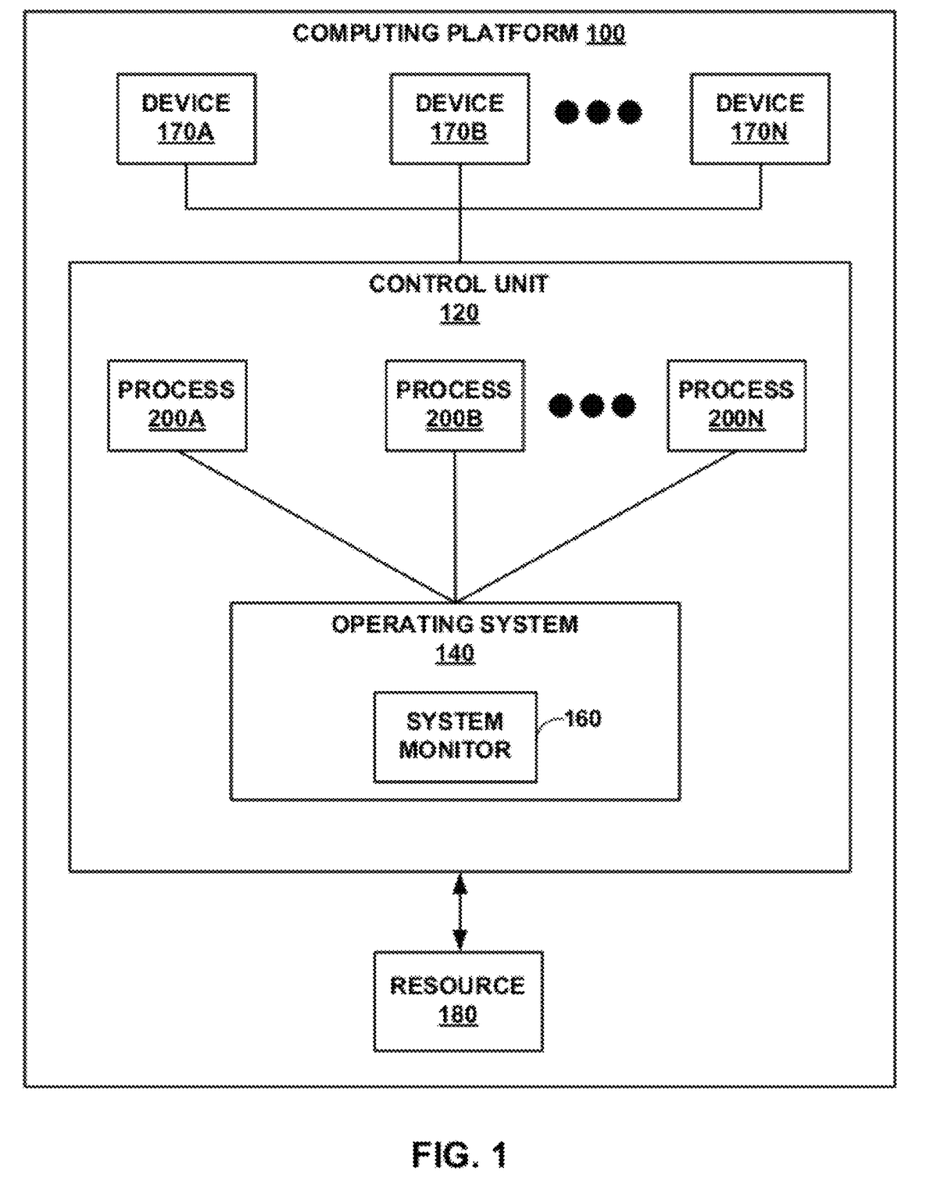
FIG. 1 is a block diagram illustrating an example computing platform that can be used to establish a channel of communication between a system monitor and one or more software processes in accordance with one or more aspects of this disclosure.

FIG. 1 is a block diagram illustrating an example computing platform 100 that can be used to establish a channel of communication between a system monitor and one or more software processes in accordance with one or more aspects of this disclosure. Computing platform 100 can be a personal computer, tablet computer, laptop, cellular telephone, personal digital assistant and/or some other mobile/portable device.

As shown in FIG. 1, computing platform 100 includes control unit 120. Control unit 120 can include hardware, software, and/or firmware. In some examples, hardware, such as one or more processors, can execute software instructions (usually in the form of a computer or software program) to implement one or more aspects of this disclosure. The software instructions can be stored on a non-transitory computer-readable data storage medium. Example non-transitory computer-readable data storage media can include volatile memory, such as random access memory (RAM), including dynamic RAM (DRAM), static RAM (SRAM), and other volatile memories, and/or non-volatile memories, such as read-only memory (ROM), flash memory, magnetic memories such as hard and floppy disks, compact discs, electronic programmable ROM (EEROM), or any other type of non-volatile memory.

Non-transitory computer-readable data storage media can also include, as another example, storage devices such as compact disk ROMs (CD-ROMs), digital video disk ROMS (DVDs), hard drives, so-called "thumb drives," and/or any other type of storage device. In some examples, control unit 120 can represent hardware, which, for example, can include one or more digital signal processors (DSPs), general purpose microprocessors, application specific integrated circuits (ASICs), field programmable gate arrays (FPGAs), or other equivalent integrated or discrete logic circuitry.

Control unit 120 executes or implements an operating system 140 that includes a system monitor 160. System monitor 160 is configured to monitor and manage at least resource 180. Resource 180 can include, but is not limited to, physical RAM residing within computing platform 100, usage of part or all of control unit 120, access/control of data between control unit 120 and one or more of devices 170A-170N, and/or resources within operating system 140, such as new threads or processes.

In addition, system monitor 160 monitors all processes that are active on computing platform 100, noting a process type and/or a process status of each monitor process. A process type can be used to classify a kind of a process, such as a normal process, game, core service, user-visible, high-resource, and background service, among other process. A process status can indicate an execution state of the process, such as running in the foreground, running in the background, blocked, idle and terminated. Other process types and statuses are possible as well.

System monitor 160 can use the process type and/or process status of a process in determining whether a process should be granted more resources or terminated, for example. One or more applications and services can execute on computing platform 100 and, in particular, on control unit 120. These applications and services, referred to collectively throughout this disclosure as "processes," are depicted in FIG. 1 as software processes 200A-200N.

Devices 170A-170N permit interaction with computing platform 100 by enabling input into and/or output from computing platform 100. Example devices 170A-170N include, but are not limited to, touch screens, touch pads, still and/or video cameras, microphones, computer mice, keyboards, buttons, keys, wired and/or wireless network interfaces, communication devices, storage devices, displays, light emitting diodes (LEDs), printers, light bulbs, speakers, and audio/video ports.

Computing platform 100 can be configured with resource constraint negotiation capabilities, such as resource allocation recommendations, to aid software developers in writing applications that enhance performance of computing platform 100. As an example of the resource constraint negotiation capabilities, a software process, such as Process 200A, running on computing platform 100 can generate a query message configured to request allocation of one or more resources. Once generated, Process 200A can send the query message to system monitor 160.

System monitor 160 can monitor an amount of the resource that is currently allocated to process 200A and an amount of the resource for computing platform 100. Then, in response to the query message, system monitor 160 can evaluate how satisfying an allocation request for resources specified in the query message would affect computing platform 100. To satisfy an actual allocation request, system monitor 160 can allocate a resource such as memory, control unit usage, and/or bandwidth, create a resource such as a new thread, reserve a resource, such as access to one of devices 170A-170N, and/or initiate a resource, such as starting a new process.

After determining how satisfying an allocation request for resources specified in the query message affects computing platform 100, system monitor 160 can generate a resource allocation recommendation regarding allocation of the requested resource. As one example, system monitor 160 can respond with an "approved" resource allocation recommendation when computing platform 100 currently has enough resources to readily grant the allocation request. As another example, when computing platform 100 has just enough available resources, then system monitor 160 can respond with a "proceed with caution" resource allocation recommendation. Other recommendations are possible as well.

System monitor 160 can transmit the resource allocation recommendation to process 200A. Then, process 200A can use the resource allocation recommendation to determine whether to make an allocation request requesting the resources specified in the query message.

An Example System Monitor

Figure 2:
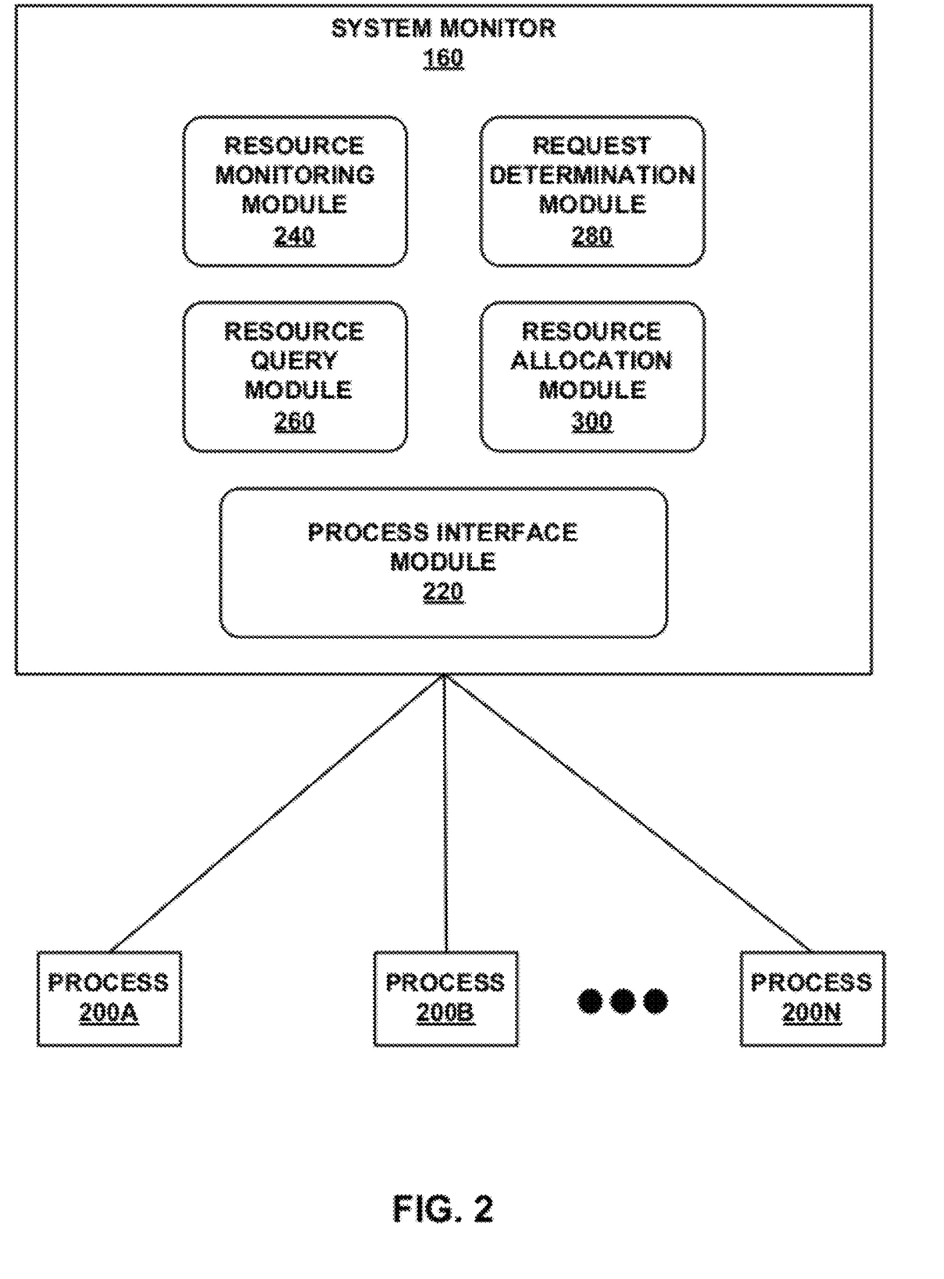
FIG. 2 is a block diagram illustrating a system monitor and various processes in accordance with one or more aspects of this disclosure.

FIG. 2 is a block diagram illustrating a system monitor in accordance with one or more aspects of this disclosure. As seen in FIG. 2, system monitor 160 includes several modules including process interface module 220, resource monitoring module 240, resource query module 260, request determination module 280, and resource allocation module 300.

Process interface module 220 can establish a channel of communication between system monitor 160 and each software process 200A-200N running on computing platform 100 to allow system monitor 160 to receive and transmit messages to and from one or more of processes 200A-200N. Via process interface module 220, each process 200A-200N can query system monitor 160 regarding the acceptability of a given request for a resource. In response to the query, system monitor 160 can inform the requesting process, via process interface module 220, how the additional resource allocation for the process would affect computing platform 100 and transmit a recommendation to the process on how the process should proceed with the request.

In addition, system monitor 160 can transmit message(s), via process interface module 220, to inform processes 200A-200N of changes to resource constraints. For example, system monitor 160 can send a resource change message to each of processes 200A-200N when memory has been added to computing platform 100 and thus indicate that processes 200A-200N have more memory available. A resource change message need not be in response to a query from a particular process but can instead be a sent as an information message to some or all of processes 200A-200N.

Process interface module 220 can be implemented using various inter-process communication (IPC) techniques. For example, process interface module 220 can be implemented as a local socket, e.g., a Unix-like socket. Numerous other IPC techniques can be used to communicate between system monitor 160 and processes 200A-200N. For example, process interface module 220 can be implemented using remote procedure calls (RPCs).

Resource monitoring module 240 can monitor the resources of computing platform 100, either continuously or periodically. That is, resource monitoring module 240 can monitor available system-wide memory, bandwidth, processor usage, battery power, and/or other resources.

Resource query module 260 can receive a query message from one or more processes 200A-200N and evaluate, based on the system-wide status of the resources as monitored by resource monitoring module 240, the overall system-wide effect if system monitor 160 granted a request for additional resources as specified in the query message. To be clear, the query message is not a request for allocating additional resources. Rather, the querying process, e.g., process 200A, is asking system monitor 160 to determine the effects on computing platform 100 if a request were made for the resources listed in the query message. In response to the query message, resource query module 260 generates and sends a resource allocation recommendation with respect to the additional amount of the resource proposed for allocation by the software process.

For example, suppose process 200A generates a query message to send to system monitor 160 and, in particular, resource query module 260, via process interface module 220. The query message can specify a requesting process, e.g., process 200A, the resource, e.g., memory, and the amount of the resource, e.g., 5 megabytes, that it is considering requesting. In some embodiments, the query message can also specify a process type and/or a process status. In response, system monitor 160 can provide a resource allocation recommendation guiding the querying process on proceeding or not proceeding with a subsequent resource allocation request.

Request determination module 280 receives resource allocation requests for additional resources from requesting processes. As previously discussed, a requesting process, such as process 200A, can send a query message, and in response, receive a resource allocation recommendation. In response to the resource allocation request, requesting process 200A can send a resource allocation request to actually obtain additional resources from system monitor 160.

Upon receiving the resource allocation request via process interface module 220, request determination module 280 determines, based on the system-wide status of the resources as monitored by resource monitoring module 240, that providing the resources requested by requesting process 200A is either acceptable or unacceptable and correspondingly either grants or denies the resource allocation request. If request determination module 280 grants the resource allocation request, system monitor 160 allocates the requested resources to requesting process 200A via resource allocation module 300 and sends a resource allocation response with the requested resource. If request determination module 280 denies the request from requesting process 200A, system monitor 160 may, in some instances, terminate requesting process 200A.

Example Interactions Between Processes and the System Monitor

Figure 3:
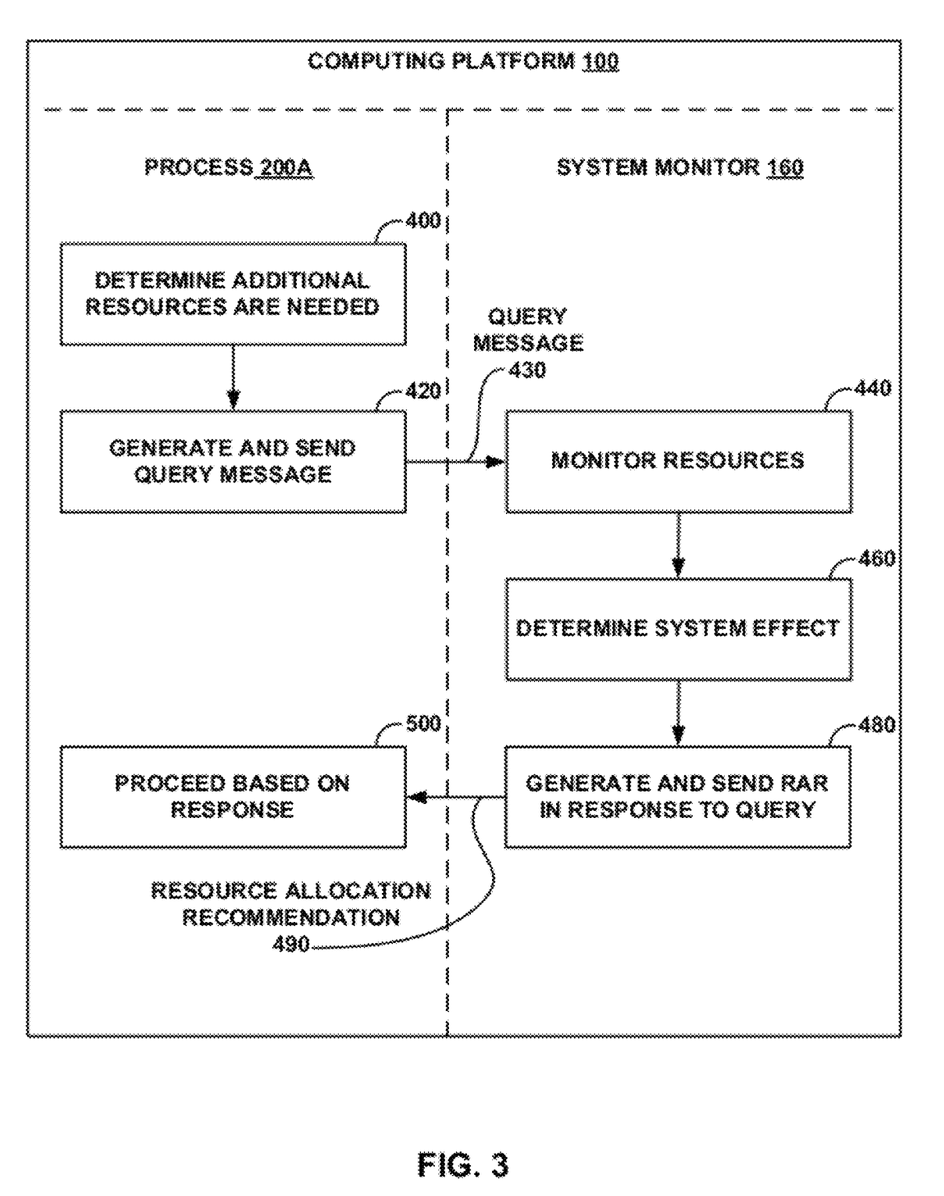
FIG. 3 is an example interaction diagram for an interaction between a computing platform and a process, in accordance with one or more aspects of this disclosure.

FIG. 3 is an example interaction diagram for an interaction between system monitor 160 for computing platform 100 and an example process 200A executing on computing platform 100, in accordance with one or more aspects of this disclosure. In the non-limiting example of FIG. 3, which is provided for purposes of illustration only, it is assumed that computing platform 100 has the following resource constraints: 100 megabytes (MB) of memory available, 50 MB of which are being used by operating system 140, e.g., a kernel and any privileged system processes. It is further assumed that the system requires that an emergency buffer of 10 MB of free memory be maintained and that a user-initiated process resident in memory, which has recently been used by a user, is currently using 10 MB of memory. In the description below, reference is made to one or more of the modules shown in FIG. 2 for purposes of illustration only. Any combination of one or more modules, including one or more of the modules shown in FIG. 2, can be utilized to perform the acts shown in FIGS. 3, 4A, and 4B.

FIG. 3 shows block 400 where process 200A can determine a need for additional resources, e.g., more memory. At block 420, process 200A can generate and send a query message, such as query message (QM) 430, to system monitor 160. For example, query message 430 can specify a requesting process e.g., process 200A, the type of resource, e.g., memory, and a resource amount, e.g., 5 MB, to be requested from computing platform 100.

At block 440, system monitor 160 can receive query message 430 via process interface module 220, and forward the query message 430 to resource query module 260, which monitors the system-wide status of resources available to computing platform 100. In some examples, resource monitoring module 240 can monitor resources of computing platform 100 prior to receiving query message 430. In other examples, resource monitoring module 240 can begin monitoring resources of computing platform 100 in response to query message 430.

Query message 430 can prompt system monitor 160 to evaluate the effect on computing platform 100 if a resource allocation request were made for resources specified in the query message. Based on the evaluation, system monitor 160 can generate and send a resource allocation recommendation to recommend how process 200A can proceed with a subsequent resource allocation request.

At block 460, resource query module 260 can generate, based on a status of resources of computing platform 100, resource allocation recommendation (RAR) 490 estimating an overall system-wide effect if system monitor 160 grants a request for the resources specified in the query message. In this example, based on the assumptions indicated above prior to the discussion of block 400, resource query module 260 can evaluate free memory to determine 30MB of non-emergency memory is available within computing platform 100 (100 MB overall −50 MB core−10 MB emergency buffer−10 MB in use=30 MB available), and that query message 430 proposes allocation of 5 MB, or about 17% of the free 30 MB. Resource query module 260 can also compare the amount of resources allocated to process 200A with that of other processes executing on computing platform 100 to determine whether a request from process 200A for the proposed 5 MB allocation is reasonable. If the request is reasonable in comparison to other processes, then resource query module 260 can recommend allocation of 5 MB to process 200A, as 5 MB is a relatively small amount of the 30 MB of free memory.

At block 480, resource query module 260 can generate and send resource allocation recommendation 490 to process 200A in response to query message 430. Resource allocation recommendation 490 can include a recommendation level, or indication of approval or disapproval concerning allocation of more resources to process 200A. In this manner, resource query module 260 determines the level of approval for resource allocation recommendation 490 based at least upon the amount of the resource that is currently available on the computing platform.

In some embodiments, resource query module 260 can additionally or alternatively determine the recommendation level in resource allocation recommendation 490 based upon the amount of the resource that is currently allocated to the querying software process. For example, resource query module 260 can utilize a policy that restricts any process from allocating more than a predetermined amount of the resource. That is, even if there are sufficient resources available, resource query module 260 can determine that the process sending a query message for a resource is already allocated a maximum allowable amount of the resource. Further, under this example policy, resource query module 260 can terminate the process if attempts to allocate more resources beyond the maximum allowable amount. That is, resource query module 260 can determine the resource allocation recommendation based upon (a) the amount of the resource that is currently allocated to the software process, (b) the amount of the resource that is currently available on the computing platform, or (c) both the currently-allocated resource and the currently-available resource amounts.

At block 500, process 200A receives resource allocation recommendation 490 from system monitor 160 and proceeds on that basis. In this example, upon receiving a favorable recommendation, process 200A can proceed to allocate additional memory using a resource allocation request. As another example, upon receiving an unfavorable recommendation, process 200A can try to free resources via a garbage collection operation, generate an "out of memory" error, or take some other action. In this manner, process 200A negotiates with system monitor 160 for additional resources based on the resource constraints of computing platform 100.

As indicated above, system monitor 160 can generate a resource allocation recommendation with a recommendation level indicating a level of approval or disapproval for a proposed resource request. For instance, in the example above, process 200A queried the system monitor about requesting 5 MB of additional memory, with 30 MB of memory available to computing platform 100. In such an example, the system monitor can respond with a recommendation level such as "APPROVED" because there is more additional capacity available (30 MB) than what the process can request (5 MB). Other recommendation levels can include "APPROVED WITH CAUTION," "MILDLY RECOMMEND AGAINST," "MODERATELY RECOMMEND AGAINST," and "STRONGLY RECOMMEND AGAINST." Numeric values could be used as well; e.g., APPROVED=0, APPROVED WITH CAUTION=1, etc. Of course, these are only some of the potential gradations that can indicate recommendation levels. More, different, and/or fewer, recommendation levels are considered within the scope of this disclosure.

The recommendation levels can form part of a system-wide resource policy, e.g., a memory growth policy. As one example of a memory growth policy, assume that computing platform 100 allocates "normal processes" an initial amount of memory (e.g. 5 MB), and allows the normal process to increase allocated memory without complaint from system monitor 160 to a "minimal maximum" amount, such as 25 MB. For example, computing platform 100 can attempt to guarantee that a normal process that uses less than the minimal maximum will not be denied a request for additional memory. However, beyond the "minimal maximum" size of 25 MB of memory, computing platform 100 can increasingly disapprove of memory growth requests as the process grows beyond the 25 MB of memory. In some embodiments, memory can be allocated as "pages" or fixed-size blocks, such as blocks of size one kilobyte (KB), two KBs, four KBs, or some other fixed size. Then, if 1 MB of memory were allocated to the process, the allocated memory can be provided as 1,024 one-KB pages, as 512 two-KB pages, or as 256 four-KB pages.

Minimal maximum values and/or resource policies can depend on process type. For example, an "immersive application" type of process can be determined to often require more resources, such as memory, than normal processes. Then, immersive application processes can be allocated more memory initially and have a higher minimal maximum than normal processes. However, as the system can see immersive application processes as potential resource "hogs", one resource policy to moderate immersive application process resource growth is to immediately terminate a given immersive application process upon requesting more memory beyond the minimal maximum for the given immersive application process. More generally, immersive application (or similar resource intensive) processes can be allocated additional bandwidth, processor usage, and/or other resources, but can also be subject to tighter termination controls when resource requests exceed maxima such as a bandwidth maximum, a processor-usage maximum, and/or other-resource maxima.

In another aspect of the system-wide resource policy, resource query module can track which processes choose to follow (or not follow) resource allocation recommendations. For example, suppose a process P1 sends a query message for X MB of memory and, in response, receives a resource allocation recommendation with a recommendation level of "STRONGLY RECOMMEND AGAINST." Then, further suppose that process P1 immediately requests X MB of memory, thus ignoring the resource allocation recommendation.

System monitor 160 could track how many resource allocation recommendations each process, including P1, either followed or ignored. Then, suppose system monitor 160 determined a need for more resources, and also determined a need to purge processes to reclaim resources to satisfy this need. In this scenario, processes such as P1 that ignored resource allocation requests can be purged before processes that had always followed resource allocation requests. The follow/ignore recommendation aspect of a resource allocation policy can be used as a primary factor to determine processes to be purged, or as one factor among many, such as amount of resources held, process age, and other factors, in considering which process(es) are to be purged.

Table 1 below includes example pseudocode that represents how resource query module 260 of system monitor 160 can respond to a request from a "normal" type of process as discussed above (as opposed to another type of process, for example):

TABLE 1

```
// Example responses, in order, are:
// APPROVED, APPROVED_WITH_CAUTION,
MILD_RECOMMEND_AGAINST,
// MODERATE_RECOMMEND_AGAINST,
STRONG_RECOMMEND_AGAINST
if (requesting process's memory is below the minimal maximum) {
    if (system has enough free/unreserved memory to satisfy the
    request) {
        respond APPROVED;
    } else if (there is any memory that can safely be freed) {
            respond APPROVED_WITH_CAUTION;
    } else {
            respond MILD_RECOMMEND_AGAINST;
    }
} else {
    // The process is interested in growing beyond the minimal
    maximum.
    if (system has enough free/unreserved memory to satisfy the
    request) {
        respond APPROVED_WITH_CAUTION;
    } else if (there are idle processes that can be evicted to
    make enough room) {
        respond MILD_RECOMMEND_AGAINST;
    } else if (there are larger processes that can be evicted
    to make room) {
```

TABLE 1-continued

```
        respond MODERATE_RECOMMEND_AGAINST;
    } else {
        respond STRONG_RECOMMEND_AGAINST;
    }
}
```

As seen above, there are five levels of responses, or recommendation levels that can be generated by system monitor 160 via the example pseudocode shown in Table 1 above. Again, there can be more, or less, than five levels of responses in other examples. The recommendation levels can be represented, in one example, by bit patterns in the resource allocation recommendation message sent from system monitor 160 to the process. For example, in order to indicate one of the five recommendation levels listed above, a three bit field ($2^3=8$) in the resource allocation recommendation can represent the five levels.

In the example pseudocode of Table 1, system monitor 160 can generate and send an "APPROVED" resource allocation recommendation if the querying process, e.g., process 200A, is using an amount of memory that is below the predetermined "minimal maximum" amount of memory, e.g., 32 MB, and if computing platform 100 has enough free or unreserved memory to satisfy a request for the additional memory from the process. In response to receiving the "APPROVED" resource allocation recommendation from system monitor 160, the process, e.g., process 200A can proceed to request allocation of new memory.

If, however, computing platform 100 does not have enough free or unreserved memory pages to satisfy a request for the additional memory from the process, but there are memory pages that can be safely freed (e.g., memory devoted to buffering input/output or other pages that can be flushed because the data in the page exists elsewhere in computing platform 100), then system monitor 160 can generate and send an "APPROVED WITH CAUTION" resource allocation recommendation to the querying process, e.g., process 200A. Process 200A can, in response to the "APPROVED WITH CAUTION" resource allocation recommendation, proceed to allocate new memory pages and/or initiate a garbage collection operation to reclaim memory pages no longer used by the process.

If no pages can be freed to satisfy the additional memory request, then system monitor 160 can generate and send an "MILD RECOMMEND AGAINST" resource allocation recommendation, to process 200A. In response to receiving the "MILD RECOMMEND AGAINST" response from system monitor 160, process 200A can initiate a garbage collection operation to reclaim pages no longer being used and allocate new memory pages if the garbage collection operation failed to free sufficient memory to satisfy the additional memory request.

In the example pseudocode presented in Table 1 above, the process, e.g., process 200A, can seek to grow beyond the "minimal maximum" size designated by computing platform 100. For example, process 200A can seek to increase its allocated memory beyond the predetermined 32 MB "minimal maximum" size specified by computing platform 100. In the example pseudocode presented above, system monitor 160 generates and sends an "APPROVED WITH CAUTION" response if the querying process, e.g., process 200A, is requesting an amount of memory that would exceed the predetermined "minimal maximum" amount of memory, e.g., 32 MB, and if computing platform 100 has enough free or unreserved memory pages to satisfy a request for the additional memory from the process. As described above, in response to receiving the "APPROVED WITH CAUTION" response from system monitor 160, the process, e.g., process 200A can proceed to allocate new memory pages, but also initiate a garbage collection operation to reclaim pages that are no longer being used.

If one or more idle processes could be terminated such that sufficient memory could be freed to satisfy the request once the idle process(es)' memory had been reclaimed, system monitor 160 can generate and send a "MILD RECOMMEND AGAINST" response. As described above, in response to receiving the "MILD RECOMMEND AGAINST" response from system monitor 160, the process, e.g., process 200A can proceed to initiate a garbage collection operation to reclaim memory no longer being used by the process, and allocate new memory only if the garbage collection operation failed to free sufficient memory.

If there are no idle processes that could be terminated to free sufficient memory for the request, but larger processes could be terminated that could provide sufficient pages to satisfy the request, system monitor 160 can generate and send a "MODERATE RECOMMEND AGAINST" response.

In response to receiving the "MODERATE RECOMMEND AGAINST" response from system monitor 160, process 200A can proceed in a manner similar to having received a "MILD RECOMMEND AGAINST" response, but use a more aggressive garbage collection policy. An example aggressive garbage collection policy can include freeing all "softly-referenced" objects. A softly-referenced object is an object designated by a programmer to be optionally freed by a garbage-collected process. By designating an object as a softly-referenced object, the programmer has signaled explicitly that the softly-referenced object can be freed if necessary to satisfy a higher-priority request.

In the case that the request cannot be satisfied by terminating either idle or larger processes, system monitor 160 can generate and send a "STRONG RECOMMEND AGAINST" response. In response to receiving the "STRONG RECOMMEND AGAINST" response from system monitor 160, the process, e.g., process 200A can generate a suitable error; e.g., an "OUT OF MEMORY" error.

Example Scenario with Resource Allocation Recommendations

Figure 4A:
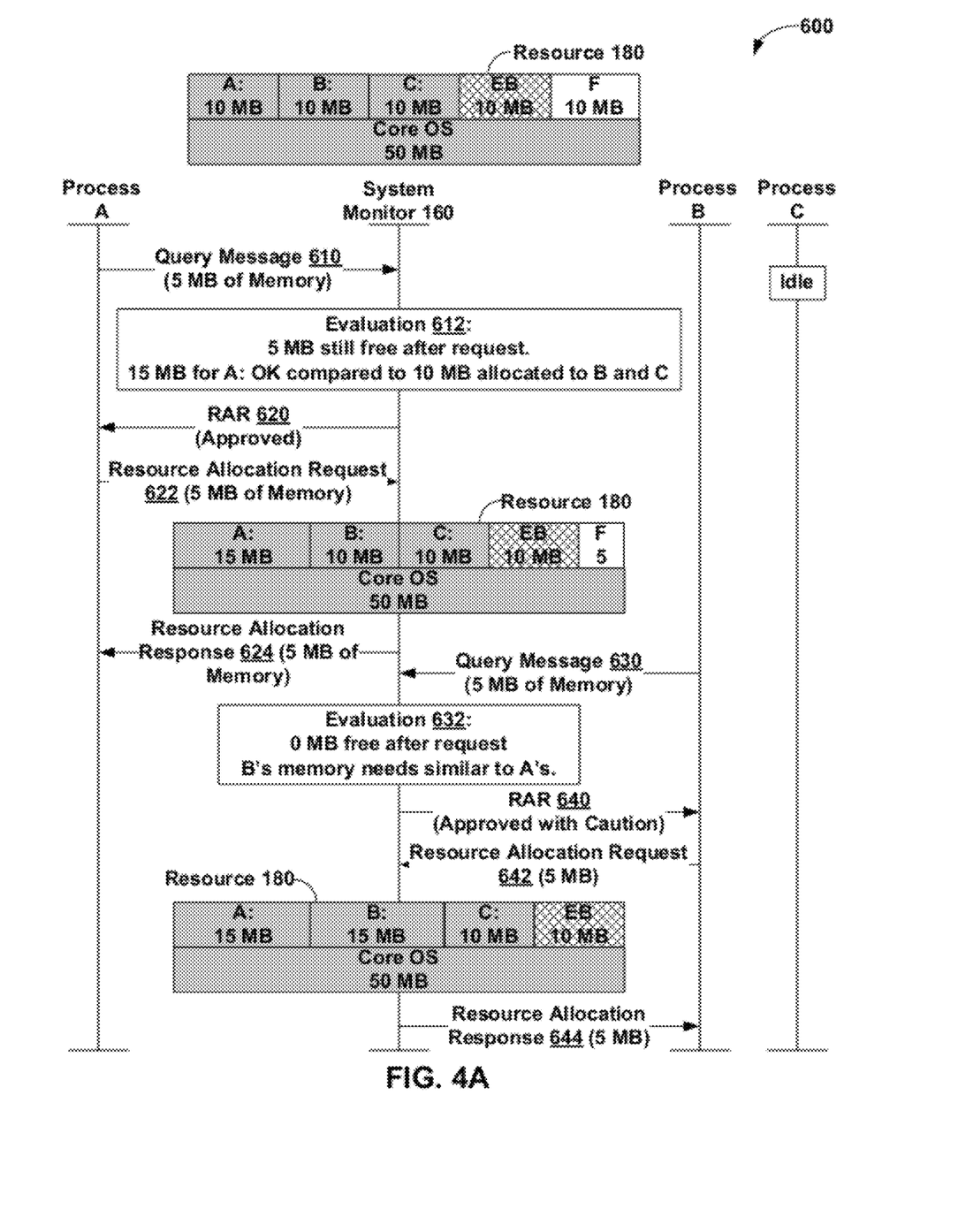
FIGS. 4A and 4B depict an example interaction diagram for an interaction between a computing platform and three processes, in accordance with one or more aspects of this disclosure.
Figure 4B:
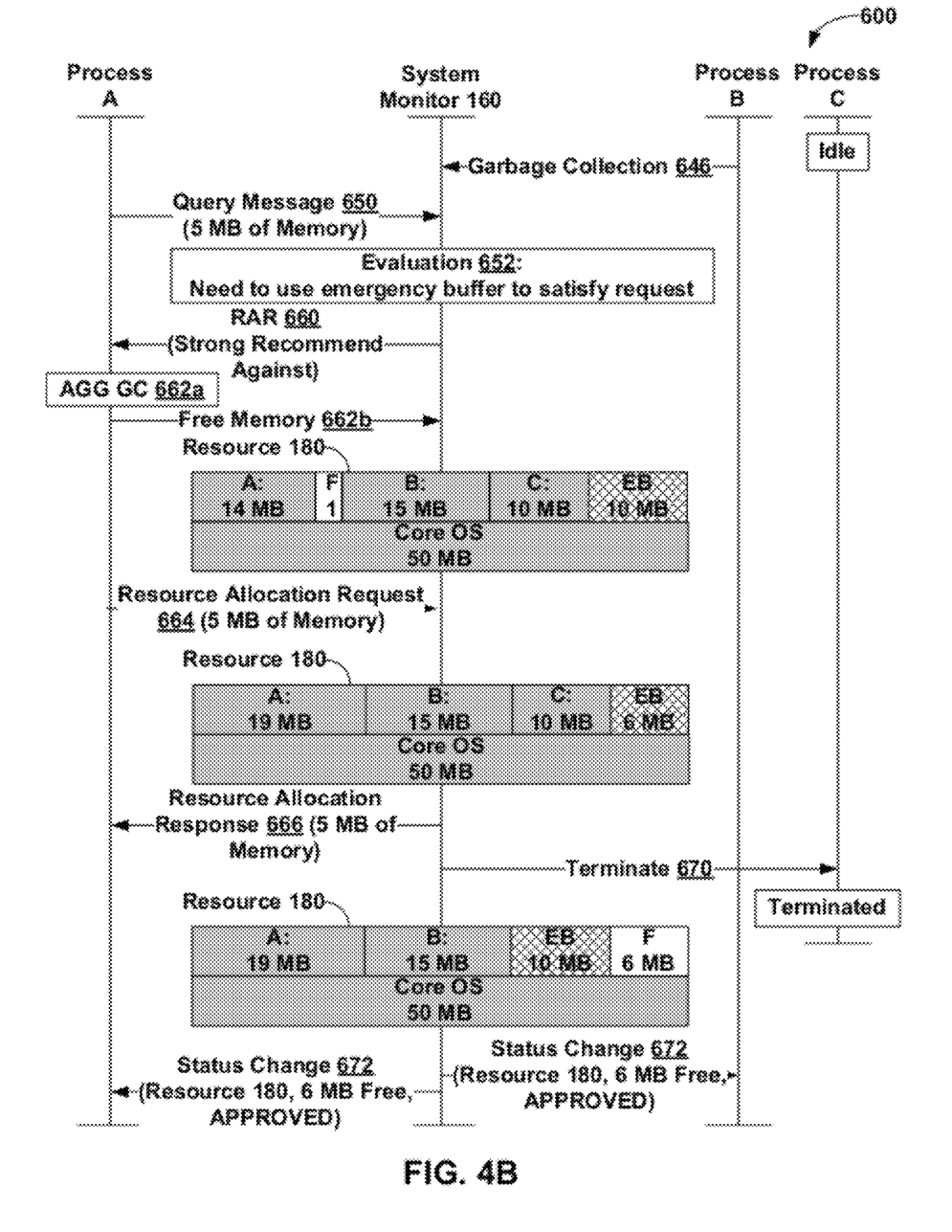

FIGS. 4A and 4B depict an example scenario 600 for an interaction between a computing platform and three processes, in accordance with one or more aspects of this disclosure. In scenario 600, an example resource 180 of computing platform 100 is 100 MB of memory. Other example resources 180 could be used as well or instead. FIG. 4A shows allocated portions of resource 180 in grey, reserved memory using cross-hatching, and unallocated portions in white. At the beginning of scenario 600 and as shown at the top of FIG. 4A, (a) 50 MB of resource 180 are allocated to core operating system (OS) 140, (b) three user-initiated Processes A, B, and C are each currently allocated 10 MB of memory, each of which having been recently used by the user, and (c) 10 MB is reserved as an emergency buffer (EB). In scenario 600, system monitor 160 attempts to maintain a 10 MB "emergency buffer minimum", or minimum amount of memory allocated to the emergency buffer. As shown in FIG. 4A, at the beginning of scenario 600, 10 MB of free (F) or unallocated memory is available for use by user-initiated processes such as Processes A, B, and C.

Scenario 600 continues with Process A determining a need for additional memory. In preparation for requesting more memory, Process A generates and sends query message 610. Query message 610 asks system monitor 160 to determine the effects on computing platform 100 if a request were made for resources specified in query message 610 and to provide an opinion on how Process A should proceed. In scenario 600, query message 610 specifies a requesting process of Process A, a type of resource of memory, and a resource amount of 5 MB that the requesting process proposed for allocation from computing system 100.

System monitor 160 receives query message 610 using process interface module 220, e.g., a socket, and forwards query message 610 to resource query module 260. Resource query module 260 makes evaluation 612 to consider the overall system-wide effect of granting a request for resources specified in query message 610, based on the system-wide status of at least resource 180.

In making evaluation 612, resource query module 260 determines that 10MB of non-emergency memory is available to processes within computing platform 100. Also, granting a request to Process A for an additional 5 MB would leave 5 MB of memory still free in resource 180. Further, resource query module 260 determines that providing process A with an additional 5 MB of memory, for a total of 15 MB, is not excessive compared to the 10 MB used by similar Processes B and C. Thus, system monitor 160 can determine that the request would be approved.

As shown in FIG. 4A, after evaluation 612, system monitor 160 generates and sends resource allocation recommendation (RAR) 620 indicating approval of a request as specified in query message 610. In scenario 600, resource allocation recommendation 620 indicates the request is "APPROVED" using the recommendation levels described above in the context of Table 1.

Based on resource allocation recommendation 620 indicating approval, Process A can generate and send allocation request 622, requesting allocation of an additional 5 MB of resource 180 In response to resource allocation request 622, resource allocation module 300 allocates the requested 5 MB of memory to Process A. System monitor 160 can inform Process A of the allocation via resource allocation response 624.

In some embodiments, when evaluation 612 determines that a resource allocation request based on query message 610 has an APPROVED recommendation level, and perhaps other recommendation levels, system monitor 160 can allocate the requested resources in response rather than responding with a resource allocation recommendation. That is, in response to query message 610, system monitor can send a resource allocation response indicating allocation of the requested resources, such as resource allocation response 624. In some of these embodiments, the resource allocation response can include data representing the recommendation level that would be provided with a resource allocation response.

Scenario 600 continues with Process B determining a need for an additional 5 MB of resource 180. Process B then generates and sends query message 630 with a requesting process of Process B, a type of resource of memory, and a resource amount of 5 MB.

As shown in FIG. 4A, system monitor 160 receives query message 630 from Process B. Query message 630 is forwarded to resource query module 260 to make evaluation 632 to consider the effect of granting a request for resources specified in query message 630.

In making evaluation 632, resource query module 260 determines that 5 MB of non-emergency memory is available to processes within computing platform 100. Also, granting a request to Process B for an additional 5 MB would leave no free memory for resource 180, outside of any free memory in the emergency buffer. In addition, resource query module 260 can determine that Process B's resource allocation of 15 MB is the same as that of Process A, and similar to the 10 MB allocated to Process C. Therefore, Process B's allocation request is reasonable in comparison to resources used by similar Processes A and C, and so the request should be approved, but the lack of non-emergency free memory after approval indicates that caution is warranted.

As shown in FIG. 4A, after evaluation 632, system monitor 160 generates and sends resource allocation recommendation 640 to Process B. In scenario 600, resource allocation recommendation 640 indicates cautionary approval of the request specified in query message 630 with the "APPROVED WITH CAUTION" recommendation level of the recommendation levels described above in the context of Table 1.

In scenario 600, Process B can request 5 MB of resource 180 in accord with an APPROVED WITH CAUTION recommendation level of resource allocation recommendation 640. Thus, Process B can generate and send allocation request 642 to requesting allocation of an additional 5 MB memory from resource 180. In response to resource allocation request 642, resource allocation module 300 allocates the requested 5 MB of resource 180 to Process B and informs Process A of the 5 MB allocation from resource 180 via resource allocation response 644.

Turning to FIG. 4B, as the request is approved with caution, Process B can initiate measures to reclaim resource 180, such as invoking a garbage collection operation to reclaim memory pages no longer being used by Process B. The garbage collection operation for a process can be invoked via garbage collection message 646 and/or can involve an internal memory-reclaiming operation of the process. In scenario 600, Process B invokes garbage collection garbage collection message 646 to system monitor 160. Process B can request the additional 5MB of resource 180 before, after, or simultaneously with invocation of the garbage collection operation. In scenario 600, this garbage collection operation did not reclaim an appreciable amount of memory from Process B.

Scenario 600 continues with Process A determining a need for an additional 5 MB from resource 180. Process A then generates and sends query message 650 that specifies a requesting process of Process A, a type of resource of memory, and a resource amount of 5 MB that the requesting process proposed for allocation from computing system 100.

As shown in FIG. 4B, system monitor 160 receives query message 650 from Process B. Query message 650 is forwarded to resource query module 260 to make evaluation 652 to consider the effect of granting a request for additional resources from Process A as specified in query message 650, based on a system-wide status of at least resource 180.

In making evaluation 652, resource query module 260 determines that, while Process A is active, reclaimed and/or emergency buffer memory would have to be used to satisfy a request corresponding to query message 650. If no memory is reclaimed, system monitor 160 would have to satisfy the request from emergency buffer memory alone, which would take the emergency buffer below the emergency buffer minimum. Therefore, resource query module 260 can strongly recommend against accepting a request based on query message 650.

After evaluation 652, system monitor 160 generates and sends resource allocation recommendation 660 to Process A. In scenario 600, resource allocation recommendation 660 indicates lack of approval of the request specified in query message 650 with a "STRONG RECOMMEND AGAINST" level of the recommendation levels described above in the context of Table 1.

Upon receiving resource allocation recommendation 660 with a strong recommendation against allocation of resource 180, FIG. 4B shows that Process A utilizing internal functionality to perform aggressive garbage collection (GC) 662a. An aggressive garbage collection operation for Process A can include a normal garbage collection operation to reclaim memory pages that are no longer being used by Process A (e.g., a garbage collection operation such as performed for Process B as discussed above). An aggressive garbage collection operation can further include reclaiming memory pages that are only softly-referenced by Process A. In scenario 600 and as shown in FIG. 4B, the aggressive garbage collection operation frees up 1 MB of resource 180 for system monitor 160 to reclaim from Process A, leaving Process A with 14 MB of allocated memory and 1 MB of free memory in resource 180. Process A uses Free Memory message 662b to inform system monitor 160 about and/or provide system monitor 160 with the freed 1 MB of memory. In some embodiments, Process A can send multiple Free Memory messages 662b to inform and/or provide memory to system monitor 160.

Subsequently, Process A sends resource allocation request 664 to request 5 MB of resource 180. In scenario 600, resource allocation request 664 can be granted using the 1 MB of free memory and 4 MB from the emergency buffer of resource 180. After granting resource allocation request 664, resource 180 has 6 MB remaining in the emergency buffer, and Process A has allocated a total of 19 MB. System monitor 160 sends resource allocation response 666 providing the allocated portion of resource 180 to Process A.

In some scenarios, resource allocation request 664 can be delayed in response to the recommendation against resource allocation, with the intent of waiting for some other process(es) to free up part or all resource 180. For example, Process A can wait a short length of time e.g., a few nanoseconds, or some longer length of time before sending resource allocation request 664. The length of time to delay sending resource allocation request 664 can depend upon the resource(s) being requests, the amount(s) of resource(s) begin requested, a recommendation level received in the resource allocation recommendation 660, recommendation level(s) received in resource allocation recommendation(s) prior to resource allocation recommendation 660, amount(s) of resource(s) allocated to the process; e.g., Process A, and other factors as well or instead.

As another example, if resource allocation recommendation 660 indicates lack of approval of the request specified in query message 650 with a "STRONG RECOMMEND AGAINST" level, or perhaps a "MODERATE RECOMMEND AGAINST" level of the recommendation levels described above in the context of Table 1, a priority of the application can be determined. If the priority is relatively low, system monitor 160 and/or the application itself can voluntarily postpone some or all operations until a later resource allocation recommendation 660 indicates a higher level of approval of the request. In particular embodiments, the application can free resources or perhaps self-terminate to allow other processes to complete using the now-available resources.

Subsequently, system monitor 160 determines a need to restore the emergency memory buffer to the emergency buffer minimum of 10 MB. During scenario 600, Process C has been idle and so system monitor 160 can terminate at least one idle software process, such as Process C, when an emergency buffer is below a threshold level, such as an emergency buffer minimum of 10 MB.

To free up memory for the emergency buffer, system monitor 160 can terminate idle process C via terminate message 670. Upon termination, Process C releases 10 MB of resource 180, thereby decreasing memory usage of computing platform 100 below the emergency buffer zone of 10 MB. Then, 4 MB of the 10 MB reclaimed from now-terminated Process C can be allocated to the emergency buffer, restoring the emergency buffer to the emergency buffer minimum of 10 MB. As shown in FIG. 4B, the remaining 6 MB of reclaimed memory can be designated as free memory.

System monitor 160 can inform some or all processes of changes to resource constraints. For example, in response to termination from Process C, scenario 600 continues with system monitor 160 generating and transmitting status change message 672 to Processes A and B. Status change message 672 can include a resource indicator for indicating the resource whose status has changed, a free-resource value indicating a free amount of the resource, and perhaps other data, such as a recommendation level. FIG. 4B shows status change message indicating a status change to resource 180 to currently indicating that 6 MB of memory of resource 180 is free, and that resource 180 is associated with an APPROVED recommendation level. In this fashion, system monitor 160 can indicate to processes executing on computing platform 100 that there is no longer an impending memory emergency.

In scenarios not shown in FIGS. 4A-4B, system monitor 160 can use other criteria along with or instead of the idle process criterion discussed above to determine process(es) for termination. For example, suppose that Process C was active during scenario 600 when memory was allocated from the emergency buffer to take the emergency buffer below the emergency buffer minimum. Then, to restore the emergency buffer, system monitor 160 can use criteria such as terminating a process with a maximum or, in some cases, a minimum amount of resource 180 allocated over all processes. Other example criteria include terminating a process making the most, or in some cases, least recent resource allocation request.

Additional criteria for process termination can be based on compliance/non-compliance with resource allocation recommendations. That is, system monitor 160 and/or other component(s) of computing platform 100 could track compliance with resource allocation recommendations and terminate process(es) that do not comply with resource allocation recommendations. For example, suppose a Process IG receives a resource allocation recommendation that recommends against making a resource allocation request, and Process IG ignores the recommendation and persists in making a resource allocation request without attempting to reclaim resources or otherwise ameliorate the negative recommendation. Then, system monitor 160 and/or other component(s) of computing platform 100 can note that Process IG ignored a resource allocation recommendation not to request resources, and therefore increase the probability that Process IG will be terminated when necessary. Many other criteria for terminating processes are possible as well.

Example Operations

Figure 5:
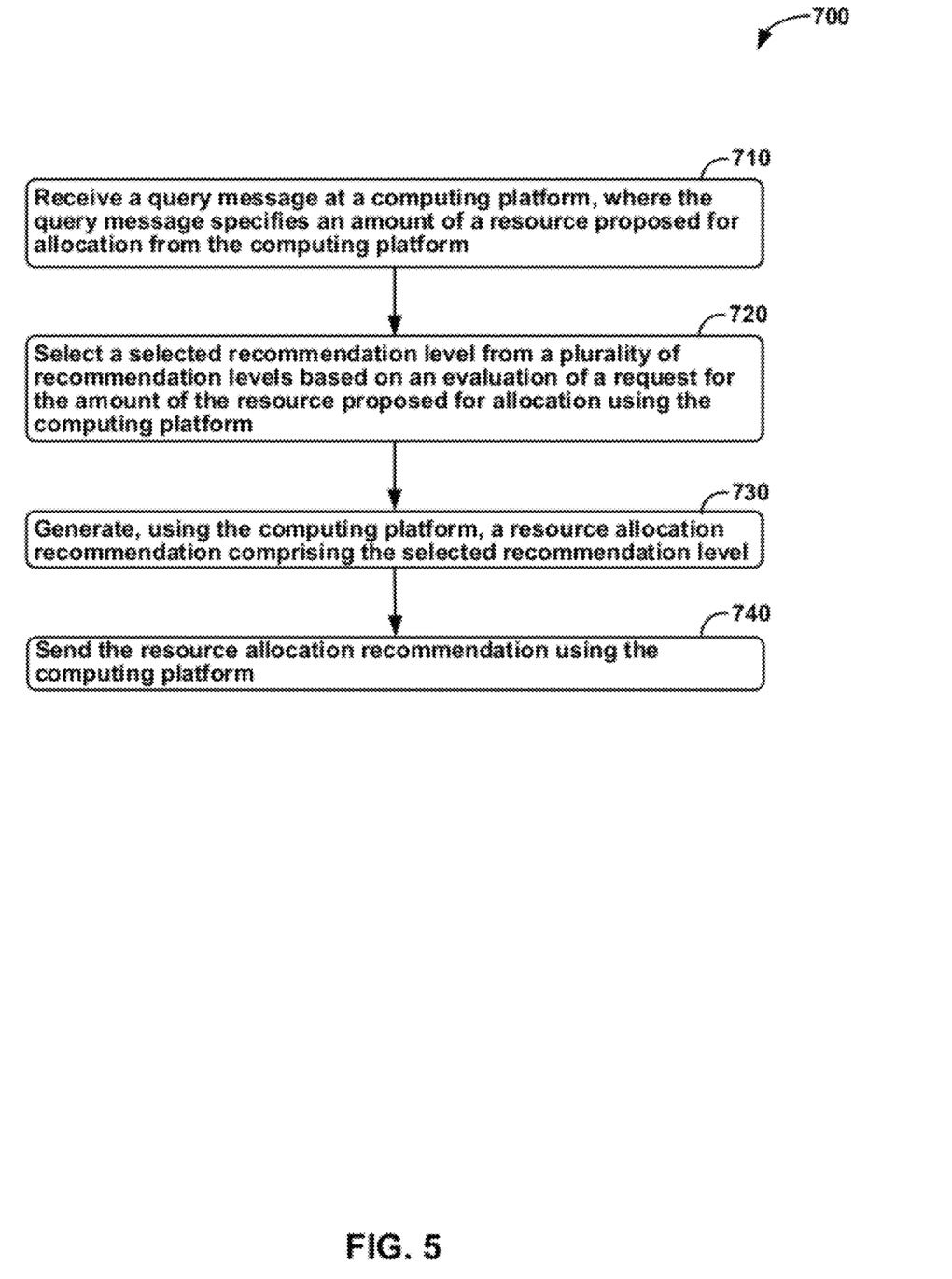
FIG. 5 is a flow diagram illustrating one example method, in accordance with one or more aspects of this disclosure.

FIG. 5 is a flow chart illustrating an example method 700 of resource constraint negotiation on a computing platform, such as computing platform 100, in accordance with one or more aspects of this disclosure.

Method 700 begins at block 710 where a query message can be received at the computing platform. The query message can specifies an amount of a resource proposed for allocation from the computing platform, such as discussed above in the context of at least FIGS. 4A-4B. For example, the resource can be memory, processor usage, bandwidth, and/or other resources.

At block 720, the computing platform can select a selected recommendation level from a plurality of recommendation levels. The selection of the selected recommendation level can be based on an evaluation of a request for the amount of the resource proposed for allocation, such as discussed above in the context of at least FIGS. 4A-4B. An example plurality of recommendation levels is discussed above at least in the context of Table 1.

In some embodiments, the evaluation of the request for the amount of the resource is based at least upon an amount of the resource allocated to a software process and an amount of the resource currently available on the computing platform, such as discussed above in the context of at least FIGS. 4A-4B. In other embodiments, the evaluation of the request for the amount of the resource is based at least on usage of the resource on the computing platform and resource usage of a software process associated with the query message compared to at least one other software process of the software processes, such as discussed above in the context of at least FIGS. 4A-4B.

At block 730, the computing platform can generate a resource allocation recommendation, which can include the selected recommendation level, such as discussed above in the context of at least FIGS. 4A-4B and Table 1.

At block 740, the computing platform can send a resource allocation recommendation, such as discussed above in the context of at least FIGS. 4A-4B.

In some embodiments, in response to sending the resource allocation recommendation, a resource allocation request for the amount of the resource can be received, such as discussed above in the context of at least FIGS. 4A-4B. In particular embodiments, in response to receiving the resource allocation request, method 700 can include (a) allocating the amount of the resource proposed for allocation and (b) generating a resource allocation response that includes the allocated amount of the resource, such as discussed above in the context of at least FIGS. 4A-4B.

In other embodiments, in response to sending the resource allocation recommendation, a message to reclaim the resource can be received, such as discussed above in the context of at least FIG. 4B.

In some embodiments, method 700 can additionally include terminating at least one software process executing on the computing platform in response to an available amount of the resource on the computing platform being below a threshold level, such as discussed above in the context of at least FIG. 4B.

In other embodiments, method 700 can additionally include terminating at least one software process executing on the computing platform based on non-compliance with resource allocation recommendations, such as discussed above in the context of at least FIG. 4B.

In still other embodiments, method 700 can additionally include transmitting a message indicating a change in a status of the resource, such as discussed above in the context of at least FIG. 4B.

Figure 6:
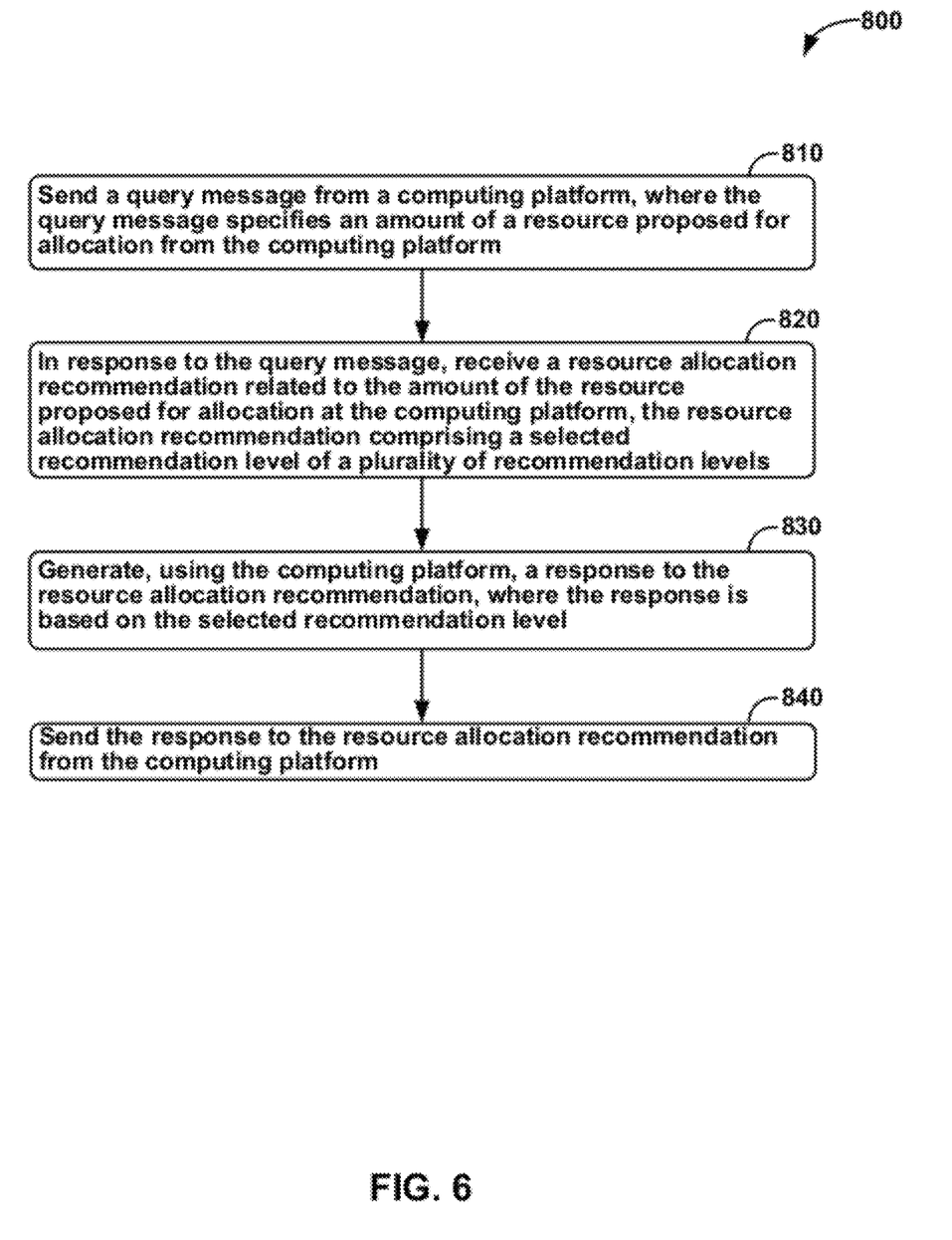
FIG. 6 is a flow diagram illustrating another example method, in accordance with one or more aspects of this disclosure.

FIG. 6 is a flow chart of an example method 800 of resource constraint negotiation on a computing platform, such as computing platform 100, in accordance with one or more aspects of this disclosure.

Method 800 begins at block 810 where a query message can be send from the computing platform. The query message can specify an amount of a resource proposed for allocation from the computing platform, such as discussed above at least in the context of FIGS. 4A-4B.

At block 820 in response to the query message, the computing platform can receive a resource allocation recommendation related to the amount of the resource proposed for allocation. The resource allocation recommendation can include a selected recommendation level of a plurality of recommendation levels, such as discussed above in the context of at least FIGS. 4A-4B and Table 1.

At block 830, the computing platform can generate a response to the resource allocation recommendation. The response can be based on the selected recommendation level, such as discussed above in the context of at least FIGS. 4A-4B.

In some embodiments, the selected recommendation level is an approval level and the response includes a resource allocation request for the amount of the resource proposed for allocation, such as discussed above in the context of at least FIGS. 4A-4B.

In other embodiments, the selected recommendation level is a recommendation-against level, and the response includes a delayed resource allocation request for the amount of the resource proposed for allocation, such as discussed above in the context of at least FIG. 4B.

In even other embodiments, the selected recommendation level is a recommendation-against level, and the response includes a garbage collection message, such as discussed above in the context of at least FIG. 4B.

At block 840, the computing platform can send the response to the resource allocation recommendation, such as discussed above in the context of at least FIGS. 4A-4B.

In some embodiments, method 800 can additionally include receiving a resource allocation response in response to the resource allocation request. The resource allocation response can include an allocated amount of the resource. The allocated amount of the resource can equal or exceed the amount of the resource proposed for allocation, such as discussed above in the context of FIGS. 4A-4B.

Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An article of manufacture including a non-transitory computer-readable storage medium having instructions stored thereon that, in response to execution by a processor of a computing platform, cause the computing platform to perform operations, the instructions comprising:
   instructions for determining whether a resource is required for execution of a process;
   instructions for, in response to determining that the resource is required, sending a query message from the process to a system monitor, wherein the query message specifies an amount of the resource proposed for allocation;
   instructions for the system monitor to, without allocating the resource proposed for allocation when the resource proposed for allocation is available:
      in response to the query message, determine a system effect based on an evaluation of a request for the amount of the resource proposed for allocation,
      select a selected recommendation level from a plurality of recommendation levels based on the evaluation of the request for the amount of the resource proposed for allocation,
      generate a resource allocation recommendation comprising the selected recommendation level, and
      send the resource allocation recommendation to the process;
   instructions to execute the process based on the received resource allocation recommendation;

instructions for, in response to sending the resource allocation recommendation, receiving a resource allocation request for the amount of the resource at the system monitor; and instructions for, in response to receiving the resource allocation request, the system monitor to:
- allocate the amount of the resource proposed for allocation; and
- generate a resource allocation response that comprises the allocated amount of the resource.

2. The article of manufacture of claim 1, wherein the evaluation of the request for the amount of the resource is based at least upon an amount of the resource allocated to a software process and an amount of the resource currently available on the computing platform.

3. The article of manufacture of claim 1, wherein the evaluation of the request for the amount of the resource is based at least on usage of the resource on the computing platform and resource usage of a software process associated with the query message compared to at least one other software process.

4. The article of manufacture of claim 1, further comprising instructions to:
terminate at least one software process executing on the computing platform in response to an available amount of the resource on the computing platform being below a threshold level.

5. The article of manufacture of claim 1, further comprising instructions to:
terminate at least one software process executing on the computing platform based on non-compliance with resource allocation recommendations.

6. The article of manufacture of claim 1, further comprising instructions to:
transmit a message indicating a change in a status of the resource.

7. The article of manufacture of claim 1, wherein the resource comprises one or more of volatile memory, bandwidth, and disk storage.

8. The article of manufacture of claim 1, wherein the instructions further comprise:
instructions for, in response to sending the resource allocation recommendation, receiving a message at the system monitor to reclaim the resource.

9. A method, comprising:
determining whether a resource is required for execution of a process;
receiving a query message at a computing platform, wherein the query message specifies an amount of a resource proposed for allocation from the computing platform;
selecting a selected recommendation level from a plurality of recommendation levels based on an evaluation of a request for the amount of the resource proposed for allocation using the computing platform without allocating the resource proposed for allocation when the resource proposed for allocation is available;
generating, using the computing platform, a resource allocation recommendation comprising the selected recommendation level without allocating the resource proposed for allocation when the resource proposed for allocation is available;
sending the resource allocation recommendation to the process using the computing platform;
executing the process based on the received resource allocation recommendation;

receiving a resource allocation request at the system monitor for the amount of the resource, in response to sending the resource allocation recommendation; and in response to the receiving the resource allocation request, the system monitor:
- allocating the amount of the resource proposed for allocation; and
- generating a resource allocation response that comprises the allocated amount of the resource.

10. The method of claim 9, wherein the evaluation of the request for the amount of the resource is based at least upon an amount of the resource allocated to a software process and an amount of the resource currently available on the computing platform.

11. The method of claim 9, wherein the evaluation of the request for the amount of the resource is based at least on resource usage on the computing platform and resource usage of a software process associated with the query message compared to at least one other software process.

12. The method of claim 9, further comprising:
terminating at least one software process executing on the computing platform in response to an available amount of the resource on the computing platform being below a threshold level.

13. The method of claim 9, further comprising:
terminating at least one software process executing on the computing platform based on non-compliance with resource allocation recommendations.

14. The method of claim 9, further comprising:
transmitting a message indicating a change in a status of the resource.

15. The method of claim 9, further comprising:
receiving a message to reclaim the resource, in response to sending the resource allocation recommendation.

16. The method of claim 9, wherein the resource comprises one or more of volatile memory, bandwidth, and disk storage.

17. An article of manufacture including a non-transitory computer-readable storage medium having instructions stored thereon that, in response to execution by a processor of a computing platform, cause the computing platform to perform operations, the instructions comprising:
instructions for determining whether a resource is required for execution of a process;
instructions for sending a query message that specifies an amount of a resource proposed for allocation;
instructions for, in response to the query message, receiving a resource allocation recommendation related to the amount of the resource proposed for allocation, the resource allocation recommendation comprising a selected recommendation level of a plurality of recommendation levels without allocating the resource proposed for allocation when the resource proposed for allocation is available;
instructions for generating a response to the resource allocation recommendation, wherein the response comprises a resource allocation request for the amount of the resource proposed for allocation and is based on the selected recommendation level without allocating the resource proposed for allocation when the resource proposed for allocation is available;
instructions for sending the response to the resource allocation recommendation;
instructions to execute the process based on the received resource allocation recommendation;
instructions for, in response to the resource allocation request, receiving a resource allocation response that comprises an allocated amount of the resource; and instructions to execute the process based on the allocated amount of the resource.

18. The article of manufacture of claim 17, wherein the selected recommendation level comprises an approval level.

19. The article of manufacture of claim 17, wherein the allocated amount of the resource equals or exceeds the amount of the resource proposed for allocation.

20. The article of manufacture of claim 17, wherein the selected recommendation level further comprises a recommendation-against level, and wherein the response further comprises a garbage collection message.

21. A method, comprising:
   determining whether a resource is required for execution of a process;
   in response to determining that the resource is required, sending a query message from a computing platform, wherein the query message specifies an amount of a resource proposed for allocation from the computing platform;
   in response to the query message, receiving a resource allocation recommendation related to the amount of the resource proposed for allocation at the computing platform, the resource allocation recommendation comprising a selected recommendation level of a plurality of recommendation levels without an allocation of the resource proposed for allocation when the resource proposed for allocation is available;
   generating, using the computing platform, a response to the resource allocation recommendation wherein the response comprises a resource allocation request for the amount of the resource proposed for allocation and is based on the selected recommendation level; and
   sending the response to the resource allocation recommendation from the computing platform;
   executing the process based on the resource allocation recommendation;
   in response to the resource allocation request, receiving a resource allocation response that comprises an allocated amount of the resource; and
   executing the process based on the allocated amount of the resource.

22. The method of claim 21, wherein the selected recommendation level comprises an approval level.

23. The method of claim 21,
   wherein the allocated amount of the resource equals or exceeds the amount of the resource proposed for allocation.

24. The method of claim 21, wherein the selected recommendation level comprises a recommendation-against level, and wherein the response comprises a delayed resource allocation request for the amount of the resource proposed for allocation.

25. The method of claim 21, wherein the selected recommendation level comprises a recommendation-against level, and wherein the response comprises a garbage collection message.

\* \* \* \* \*